United States Patent
Cheon et al.

(10) Patent No.: US 8,290,130 B2
(45) Date of Patent: Oct. 16, 2012

(54) CALLER AUTHENTICATION SYSTEM AND METHOD FOR PHISHING PREVENTION

(75) Inventors: Kyung-yul Cheon, Daejeon (KR); Soon Yong Lim, Daejeon (KR); Aesoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 167 days.

(21) Appl. No.: 12/835,321

(22) Filed: Jul. 13, 2010

(65) Prior Publication Data

US 2011/0085650 A1 Apr. 14, 2011

(30) Foreign Application Priority Data

Oct. 12, 2009 (KR) .................. 10-2009-0096561

(51) Int. Cl.
*H04M 15/06* (2006.01)
*H04M 1/56* (2006.01)
(52) U.S. Cl. ............................ 379/142.05; 379/142.17
(58) Field of Classification Search ............... 379/93.03, 379/93.17, 93.23, 142.05, 142.17; 726/2, 726/3, 4, 17, 21
See application file for complete search history.

(56) References Cited

U.S. PATENT DOCUMENTS

| | | | |
|---|---|---|---|
| 6,324,271 B1 * | 11/2001 | Sawyer et al. | 379/142.05 |
| 6,865,681 B2 * | 3/2005 | Nuutinen | 726/14 |
| 7,239,688 B1 * | 7/2007 | Sayko et al. | 379/93.02 |
| 7,340,040 B1 * | 3/2008 | Saylor et al. | 379/67.1 |
| 7,693,269 B2 * | 4/2010 | Sung et al. | 379/142.05 |
| 7,974,395 B2 * | 7/2011 | Abramson et al. | 379/145 |
| 2002/0056050 A1 * | 5/2002 | Heiden et al. | 713/201 |
| 2003/0118175 A1 * | 6/2003 | Hariri et al. | 379/355.02 |
| 2007/0022469 A1 * | 1/2007 | Cooper et al. | 726/3 |
| 2008/0181379 A1 * | 7/2008 | Chow et al. | 379/142.05 |
| 2009/0116630 A1 * | 5/2009 | O'Sullivan et al. | 379/142.05 |
| 2010/0138660 A1 * | 6/2010 | Haynes et al. | 713/171 |
| 2011/0119490 A1 * | 5/2011 | Kaal et al. | 713/169 |

FOREIGN PATENT DOCUMENTS

| | | |
|---|---|---|
| KR | 1020060096784 | 9/2006 |
| KR | 1020090061432 | 6/2009 |

* cited by examiner

*Primary Examiner* — Binh Tieu
(74) *Attorney, Agent, or Firm* — Nelson Mullins Riley & Scarborough LLP; EuiHoon Lee, Esq.

(57) ABSTRACT

A caller authentication system that may enable a called party to be provided with identification information of a caller may be provided. The caller authentication system, including: a communication system to transmit, when a call request signal is received from a calling terminal of a caller, network information and a telephone number of the calling terminal to a certificate authority server, and to request identification of the caller, the network information and the telephone number being included in the call request signal, to transmit, when identification information of the caller is received from the certificate authority server in response to the identification request, the identification information to a called terminal of a called party, and to enable the identification information to be displayed on the called terminal.

10 Claims, 4 Drawing Sheets

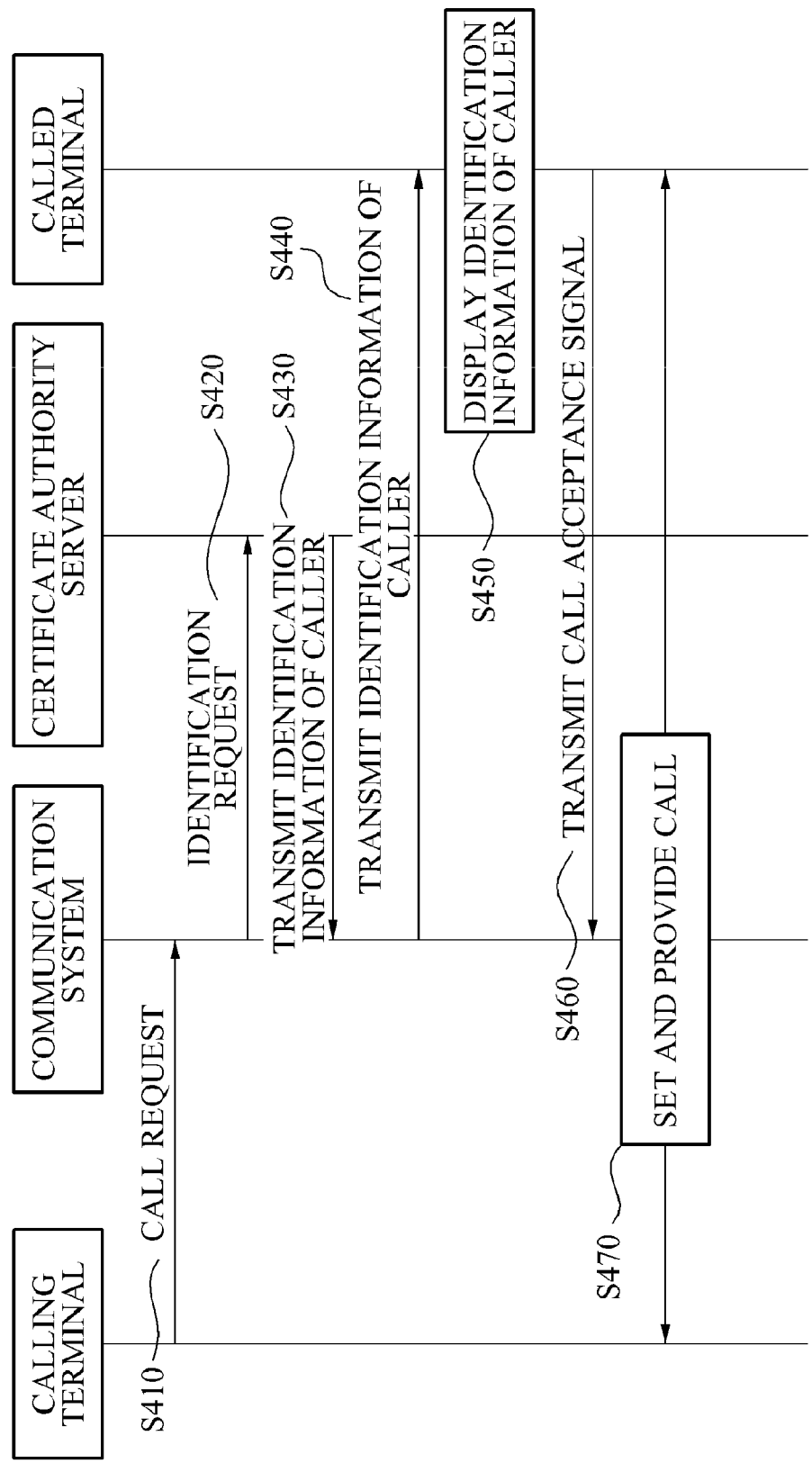

CALLER AUTHENTICATION SYSTEM AND METHOD FOR PHISHING PREVENTION

CROSS-REFERENCE TO RELATED APPLICATION

This application claims priority from Korean Patent Application No. 10-2009-0096561, filed on Oct. 12, 2009, in the Korean Intellectual Property Office, the entire disclosure of which is incorporated herein by reference.

BACKGROUND

1. Field of the Invention

The present invention relates to a caller authentication method during a call, and more particularly, to a method enabling a called party to be provided with identification information of a caller when receiving a call for phishing prevention.

2. Description of Related Art

Currently, phishing fraud that acquires money by using an email or a phone to masquerade as someone else is on the rise.

Phishing fraud using an email may be prevented by using an authentication algorithm when connected to a particular web server in a network. In phishing fraud using a phone, however, a called party may be provided with only phone number of a caller. Accordingly, when a caller is a member of a public institution, a called party that does not have information about a phone number of the public institution may not be sure whether the caller is the member of the public institution.

Also, since a called party may not know a phone number of a caller in a wired phone that may not display a text, an identity of the caller may not be ascertained.

Accordingly, a method that may authenticate an identity of a caller, provide a called party with the identity of the caller, and provide information about the identity of the caller to a called party that uses a wired phone incapable of displaying a text may be desired.

SUMMARY

According to example embodiments, a caller authentication system and method may provide an identity of a caller to a called party through authentication from a public authentication institution, and thereby may prevent phishing fraud.

Also, according to example embodiments, a caller authentication system and method may transmit identification information of a caller using a voice message and a text message, and thus a wired phone that may not display a text message may be provided with the identification information of the caller.

Also, according to example embodiments, a caller authentication system and method may receive a phone number of a calling terminal and network information, authenticate an identity of a caller only when a phone number of an organization is relayed through a communication network of a corresponding building, and thereby may prevent phishing fraud using a phone number of the organization.

According to an aspect of the present invention, there is provided a caller authentication system, including: a communication system to transmit, when a call request signal is received from a calling terminal of a caller, network information and a telephone number of the calling terminal to a certificate authority server, and to request identification of the caller, the network information and the telephone number being included in the call request signal, to transmit, when identification information of the caller is received from the certificate authority server in response to the identification request, the identification information to a called terminal of a called party, and to enable the identification information to be displayed on the called terminal.

According to another aspect of the present invention, there is provided a caller authentication method, including: receiving a call request signal from a calling terminal of a caller; transmitting network information and a telephone number of the calling terminal to a certificate authority server and requesting identification of the caller, the network information and the telephone number being included in the call request signal; receiving identification information of the caller from the certificate authority server in response to the identification request; and transmitting the identification information of the caller to a called terminal of a called party, and enabling the identification information of the caller to be displayed on the called terminal.

According to example embodiments, a caller authentication system may provide an identity of a caller to a called party through authentication from a public authentication institution, and thereby may prevent phishing fraud.

Also, according to example embodiments, a caller authentication system may transmit identification information of a caller using a voice message and a text message, and thus a wired phone that may not display a text message may be provided with the identification information of the caller.

Also, according to example embodiments, a caller authentication system may receive a phone number of a calling terminal and network information, authenticate an identity of a caller only when a phone number of an organization is relayed through a communication network of a corresponding building, and thereby may prevent phishing fraud using a phone number of the organization.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 4 is a flowchart illustrating a caller authentication method of a communication system in response to a request from a caller according to example embodiments.

DETAILED DESCRIPTION

Figure 1:
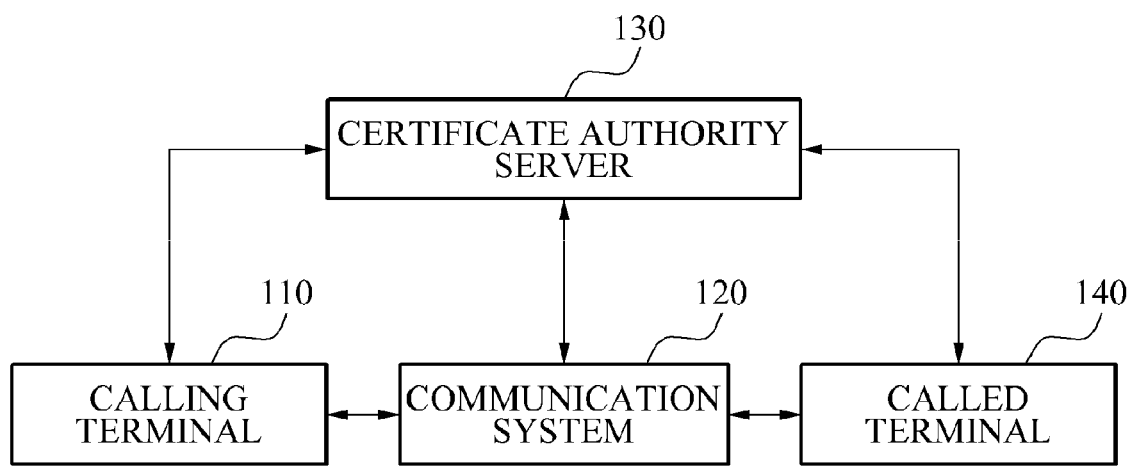
FIG. 1 is a block diagram illustrating an example of a caller authentication system according to example embodiments.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating an example of a caller authentication system according to example embodiments.

As illustrated in FIG. 1, the caller authentication system may include a calling terminal 110, a communication system 120, a certificate authority server 130, and a called terminal 140.

In the caller authentication system, the communication system 120 may authenticate an identity of a caller in response to a request from the caller, or the called terminal 140 may authenticate the identity of the caller in response to a request from a called party.

The communication system 120 may relay a wired/wireless communication.

When the identity of the caller is authenticated in response to the request from the caller, the communication system 120 may receive a call request signal from the calling terminal 110 of the caller. The call request signal may include calling information. In this instance, the calling information, received from the calling terminal 110, may include at least one of a phone number of the calling terminal 110, network information, and information about an authentication request. When the information about an authentication request of the calling information indicates that the authentication request is not required, the communication system 120 may not request the certificate authority server 130 for identification of the caller.

The network information may include information about a relay station or an internal network and an apparatus, which is initially connected to the calling terminal 110 in the communication system 120. Here, the relay station or the internal network may be used when the calling terminal 110 connects to the communication system 120. For example, the network information may be relay station identification information of a building of an organization the caller belongs to is located, or may be base station identification information of an area where the organization the caller belongs to is located.

The communication system 120 may transmit the calling information, included in the call request signal, to the certificate authority server 130 to request the identification of the caller.

Subsequently, the communication system 120 may receive identification information of the caller, transmitted by the certificate authority server 130, in response to the identification request.

Also, the communication system 120 may transmit the identification information of the caller to the called terminal 140 of the called party, and thereby may enable the identification information of the caller to be displayed on the called terminal 140. In this instance, the communication system 120 may transmit the identification information, received from the certificate authority server 130, to the called terminal 140 by converting the caller identification information into a text message or a voice message.

When the communication system 120 relays a wired communication, an example of an operation of the communication system 120 is described in detail with reference to FIG. 2. When the communication system 120 relays a wireless communication, an example of an operation of the communication system 120 is described in detail with reference to FIG. 3.

The certificate authority server 130 may register the telephone number of the calling terminal 110 and network information of an area or a building where the calling terminal 110 is located, and authenticate the organization the caller belongs to based on the telephone number of the calling terminal 110 and the network information.

When the calling information is received from the communication system 120 or the called terminal 140, the certificate authority server 130 may retrieve information about the organization based on the calling information, and transmit the caller identification information, which enables the organization to be identified, to the communication system 120 or the called terminal 140.

In this instance, the certificate authority server 130 may receive the network information, included in the calling information, and the phone number of the calling terminal 110. Also, the certificate authority server 130 may authenticate an identity of the caller only when the phone number of the calling terminal 110 is relayed through a network of a previously registered building or area. Accordingly, phishing fraud using a phone number of a public institution may be prevented.

Also, when the information about organization the caller belongs to may not be retrieved based on the received calling information, the certificate authority server 130 may request the calling terminal 110 for transmission of additional information for identification of the caller. The additional information may include information about at least one of an authentication password of the caller and an authentication password of the organization. Here, the information may not be included in the calling information.

When the identity of the caller is authenticated in response to the request from the caller, the called terminal 140 may display the caller identification information, transmitted from the communication system 120 using the text message or the voice message. Also, the called terminal 140 may be connected to the calling terminal 110 based on an operation of the called party.

Also, when the identity of the caller is authenticated in response to the request from the called party, the called terminal 140 may receive the call request signal from the calling terminal 110. The call request signal may be transmitted by the calling terminal 110 through the communication system 120.

Subsequently, the called terminal 140 may transmit the calling information, included in the call request signal, to the certificate authority server 130, and thereby may request the identification of the caller. The identification request operation may be performed before the call request signal is received and the call connection is performed, or when the call connection is performed in response to the call request signal.

Subsequently, the caller identification information, transmitted by the certificate authority server 130 in response to the identification request, may be received and displayed.

Figure 2:
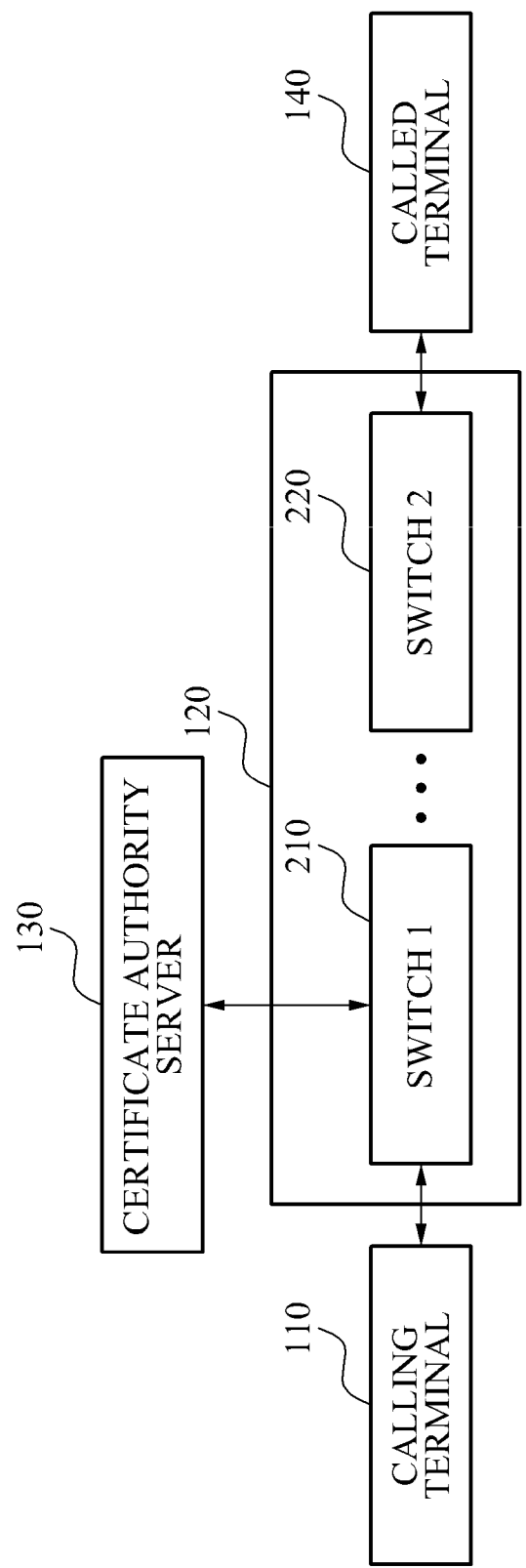
FIG. 2 is a block diagram illustrating an example of a caller authentication system in a wired communication system according to example embodiments.

FIG. 2 is a block diagram illustrating an example of a caller authentication system in a wired communication system according to example embodiments.

The caller authentication system in a wired communication system may use a communication system 120 including a plurality of switches as illustrated in FIG. 2.

A switch (1) 210, connected to a calling terminal 110, may request a certificate authority server 130 for identification of a caller. In this instance, the certificate authority server 130 may authenticate an identity of the caller only when the switch (1) 210 is a switch of an area or a building corresponding to the calling terminal 110.

Subsequently, the switch (1) 210 may receive identification information of the caller. The identification information of the caller may be transmitted by the certificate authority server 130 in response to the identification request.

Also, the switch (1) 210 may transmit the caller identification information to a switch (2) 220 connected to a called terminal 140 through switches included in the communication system 120.

Also, the switch (2) 220 may transmit the caller identification information to the connected called terminal 140, and enable the called terminal 140 to display the caller identification information.

Figure 3:
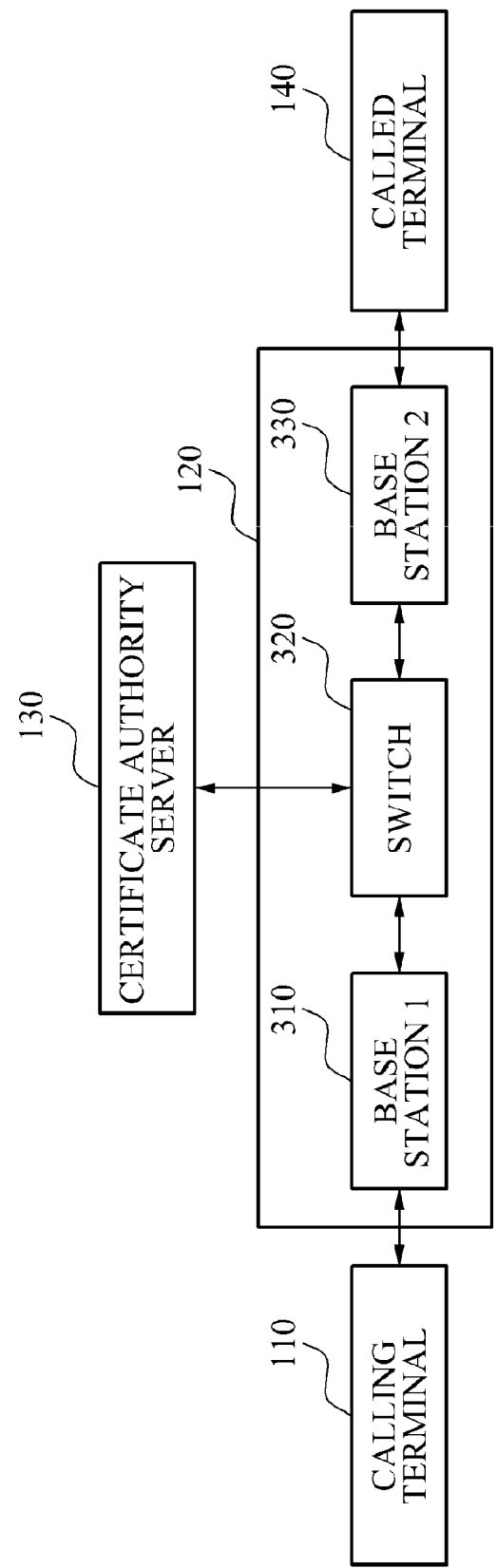
FIG. 3 is a block diagram illustrating an example of a caller authentication system in a wireless communication system according to example embodiments.

FIG. 3 is a block diagram illustrating an example of a caller authentication system in a wireless communication system according to example embodiments.

The caller authentication system in a wireless communication system may use a communication system 120 including a switch 320 and a plurality of base stations 310 and 330, as illustrated in FIG. 3. The switch 320 may relay communication among the plurality of base stations 310 and 330, and the plurality of base stations 310 and 330 may be connected to a terminal in an area. In this instance, the switch 320 may be replaced with a core network of the wireless communication network.

The base station (1) 310 may transmit a call request signal, received from a calling terminal 110, to the switch 320. The calling terminal 110 may be located in an area managed by the base station (1) 310.

Subsequently, the switch 320 may transmit calling information, included in the call request signal, to the certificate authority server 130, and request identification of the caller.

In this instance, the certificate authority server 130 may authenticate an identity of the caller only when the base station (1) 310 is a base station of an area corresponding to the calling terminal 110.

Subsequently, the switch 320 may receive identification information of the caller. The identification information of the caller may be transmitted by the certificate authority server 130 in response to the identification request.

Also, the switch 320 may transmit the caller identification information to the called terminal 140 through the base station (2) 330 of an area where the called terminal 140 is located. Accordingly, the called terminal 140 may display the caller identification information.

FIG. 4 is a flowchart illustrating a caller authentication method of a communication system in response to a request from a caller according to example embodiments.

In operation S410, the communication system may receive a call request signal including calling information from a calling terminal.

In operation S420, the communication system may request identification of a caller by transmitting the received calling information to a certificate authority server.

In operation S430, the certificate authority server may retrieve identification information of the caller based on the calling information received in operation S420, and transmit the identification information to the communication system.

Specifically, the certificate authority server may receive network information, included in the calling information, and a phone number of the calling terminal. Also, the certificate authority server may authenticate an identity of the caller only when the phone number of the calling terminal is relayed through a network of a corresponding building or area. The certificate authority server may transmit the caller identification information to the communication system.

In operation S440, the communication system may transmit the caller identification information, received in operation S430, to the called terminal.

In operation S450, the called terminal may display the caller identification information received in operation S440 to a called party.

In operation S460, when the called terminal receives a call acceptance command from the called party, the called terminal may transmit a call acceptance signal to the communication system.

In operation S470, the communication system may set a call between the calling terminal and the called terminal in response to the received call acceptance signal, and provide the call between the calling terminal and the called terminal.

According to example embodiments, a caller authentication system and method may provide an identity of a caller to a called party through authentication from a public authentication institution, and thereby may prevent phishing fraud.

Also, according to example embodiments, a caller authentication system and method may transmit identification information of a caller using a voice message and a text message, and thus a wired phone that may not display a text message may be provided with the identification information of the caller.

Also, according to example embodiments, a caller authentication system and method may receive a phone number of a calling terminal and network information, authenticate an identity of a caller only when a phone number of an organization is relayed through a communication network of a corresponding building, and thereby may prevent phishing fraud using a phone number of the organization.

The caller authentication method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A caller authentication system, comprising:
   a communication system configured to:
      transmit, when a call request signal is received from a calling terminal of a caller, network information and a telephone number of the calling terminal to a certificate authority server, the network information and the telephone number being included in the call request signal, the network information including information identifying a relay station or an internal network and information about an apparatus which is initially connected to the calling terminal in the communication system, the relay station or the internal network being used when the calling terminal connects to the communication system;
      request identification of the caller;
      transmit, when identification information of the caller is received from the certificate authority server in response to the identification request, the identification information to a called terminal of a called party; and
      enable the identification information to be displayed on the called terminal.

2. The caller authentication system of claim 1, wherein the certificate authority server registers the telephone number of the calling terminal and network information of an area or a building where the calling terminal is located, authenticates an identity of the caller when the calling terminal is relayed through a previously registered network, and transmits the identification information to the communication system.

3. The caller authentication system of claim 2, wherein, when the communication system is a wired communication system including a plurality of switches, a switch connected to the calling terminal requests the certificate authority server for the identification of the caller, and transmits the identification information of the caller to the calling terminal through the plurality of switches included in the wired communication system, the identification information of the caller being transmitted by the certificate authority server in response to the identification request.

4. The caller authentication system of claim 2, wherein, when the communication system is a wireless communication system including a plurality of base stations connected to a terminal in an area and a switch that relays communication among the plurality of base stations, the switch receives the call request signal which is transmitted by the calling terminal through the plurality of base stations, transmits calling information, included in the call request signal, to the certificate authority server, requests the identification of the caller, and transmits the identification information of the caller to the calling terminal through the base stations of the area where the calling terminal is located, the identification information of the caller being transmitted by the certificate authority server in response to the identification request.

5. The caller authentication system of claim 1, wherein the identification information of the caller is used to identify an organization the caller belongs to.

6. The caller authentication system of claim 1, wherein the communication system transmits the identification information of the caller to the calling terminal using a text message or a voice message.

7. A caller authentication method, comprising:
  receiving a call request signal from a calling terminal of a caller;
  transmitting network information and a telephone number of the calling terminal to a certificate authority server and requesting identification of the caller, the network information and the telephone number being included in the call request signal, the network information including information identifying a relay station or an internal network and information about an apparatus which is initially connected to the calling terminal in the communication system, the relay station or the internal network being used when the calling terminal connects to the communication system;
  receiving identification information of the caller from the certificate authority server in response to the identification request; and
  transmitting the identification information of the caller to a called terminal of a called party; and
  enabling the identification information of the caller to be displayed on the called terminal.

8. The caller authentication method of claim 7, further comprising:
  registering, by the certificate authority server, the telephone number of the calling terminal and network information of an area or a building where the calling terminal is located;
  authenticating, when the certificate authority server receives the identification request, an identity of the caller when the calling terminal is relayed through a previously registered network; and
  transmitting the identification information to the communication system.

9. The caller authentication method of claim 7, wherein the identification information of the caller is used to identify an organization the caller belongs to.

10. The caller authentication method of claim 7, wherein the enabling the identification information of the caller to be displayed transmits the identification information of the caller to the calling terminal using a text message or a voice message.

* * * * *